US008687026B2

(12) United States Patent
Wurzel et al.

(10) Patent No.: US 8,687,026 B2
(45) Date of Patent: Apr. 1, 2014

(54) SYSTEMS AND METHOD FOR DISPLAY TEMPERATURE DETECTION

(75) Inventors: Joshua Grey Wurzel, Sunnyvale, CA (US); Ahmad Al-Dahle, Santa Clara, CA (US)

(73) Assignee: Apple Inc., Cupertino, CA (US)

(*) Notice: Subject to any disclaimer, the term of this patent is extended or adjusted under 35 U.S.C. 154(b) by 209 days.

(21) Appl. No.: 13/246,961

(22) Filed: Sep. 28, 2011

(65) Prior Publication Data

US 2013/0076799 A1    Mar. 28, 2013

(51) Int. Cl.
G09G 5/02    (2006.01)

(52) U.S. Cl.
USPC .............................. 345/690; 345/88; 345/101

(58) Field of Classification Search
USPC ......... 345/77, 83, 88, 89, 101, 173, 174, 690; 178/18.05–18.07, 19.03; 348/790
See application file for complete search history.

(56) References Cited

U.S. PATENT DOCUMENTS

| 6,677,062 | B2* | 1/2004 | Kaneko et al. | 428/697 |
| 6,806,871 | B1* | 10/2004 | Yasue | 345/211 |
| 7,271,790 | B2 | 9/2007 | Hudson et al. | |
| 2002/0158857 | A1* | 10/2002 | Iisaka | 345/204 |
| 2003/0107546 | A1* | 6/2003 | Ham | 345/101 |
| 2005/0122305 | A1* | 6/2005 | Murao et al. | 345/101 |
| 2006/0007207 | A1* | 1/2006 | Kawaguchi | 345/204 |
| 2007/0001996 | A1 | 1/2007 | Heo | |
| 2007/0080905 | A1* | 4/2007 | Takahara | 345/76 |
| 2007/0103412 | A1 | 5/2007 | Tang et al. | |
| 2007/0132709 | A1* | 6/2007 | Kawaguchi | 345/102 |
| 2007/0229443 | A1* | 10/2007 | Sawada et al. | 345/101 |
| 2008/0012804 | A1* | 1/2008 | Kim et al. | 345/82 |
| 2008/0018569 | A1* | 1/2008 | Sung et al. | 345/82 |
| 2008/0036727 | A1* | 2/2008 | Muto et al. | 345/101 |
| 2008/0238860 | A1 | 10/2008 | Onodera | |
| 2009/0091265 | A1 | 4/2009 | Song et al. | |
| 2009/0184901 | A1* | 7/2009 | Kwon | 345/77 |
| 2009/0184984 | A1* | 7/2009 | Takahara | 345/690 |
| 2010/0001943 | A1* | 1/2010 | Leo et al. | 345/101 |
| 2010/0245228 | A1 | 9/2010 | Chen et al. | |
| 2011/0069092 | A1* | 3/2011 | Furukawa et al. | 345/690 |
| 2011/0084980 | A1* | 4/2011 | Lee | 345/589 |
| 2011/0199401 | A1* | 8/2011 | Fujiwara et al. | 345/690 |
| 2011/0205202 | A1* | 8/2011 | Son et al. | 345/207 |
| 2011/0273422 | A1* | 11/2011 | Park | 345/211 |
| 2011/0273427 | A1* | 11/2011 | Park | 345/212 |
| 2013/0057808 | A1* | 3/2013 | Mizusako et al. | 349/72 |

FOREIGN PATENT DOCUMENTS

| EP | 1098292 A2 | 5/2001 |
| EP | 2339393 A1 | 6/2011 |

OTHER PUBLICATIONS

Partial International Search Report for PCT No. PCT/US2012/057320 dated Dec. 18, 2012; 7 pages.

(Continued)

Primary Examiner — Joe H Cheng
(74) Attorney, Agent, or Firm — Fletcher Yoder PC

(57) ABSTRACT

Disclosed embodiments relate to a display temperature detection system that can detect temperature variations in different regions of a display panel. The temperature measuring display system includes a display panel that provides graphical images. Further, the temperature measuring display system includes temperature measurement circuitry. The temperature measurement circuitry includes one or more thermal diodes, transistors, or a mesh layer useful to determine at least one temperature measurement of the display panel.

27 Claims, 7 Drawing Sheets

(56) References Cited

OTHER PUBLICATIONS

Chung-Yi Chu, et al.: "Thermal Analysis and Experimental Validation on TFT-LCD Panels for Image Quality Concerns", Electronic Packaging Technology Conference, 2005. EPTC 2005. Proceedings of 7th Singapore Dec. 7-9, 2005, Piscataway, NJ, USA, IEEE, vol. 2, Dec. 7, 2005, pp. 543-548.

PCT International Search Report for PCT Application No. PCT/US2012/057320, mailed Jun. 11, 2013; 7 pgs.

* cited by examiner

SYSTEMS AND METHOD FOR DISPLAY TEMPERATURE DETECTION

BACKGROUND

The present disclosure relates generally to display panels, and more particularly, to detection of temperatures within the display panels.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Many electronic devices include display panels that provide visual images to a user of the electronic device. These display panels may emit non-uniform temperatures in various areas of the display panels. For example, in a display panel that uses light emitting diodes (LEDs), the display temperatures may be higher in regions near the LEDs than in regions further away from the LEDs. Also, heat generating components near the display screen, such as drivers, can also contribute to temperature variations on the display.

Temperature variations in the display panels may produce color maladies, such as producing more blue in higher temperature areas and producing more yellow in lower temperature areas. Thus, understanding the temperature variations in the display panels may help manufactures to counteract these color maladies. Manufactures of electronic devices may attempt to simulate the variations in temperature using software models. However, such models may be insufficient to understand the true nature of the color variations in physical prototypes of the display panels. Further these models merely provide a prediction of possible temperature variations.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to devices and methods for determining temperature values of a display. For example, the temperature values of the display may be obtained through thermal diodes and/or through measuring resistance and/or capacitance in a mesh layer. In certain embodiments, the temperature values of the display are used to adjust white points of the display to reduce color maladies based upon the non-uniform temperatures of the display.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
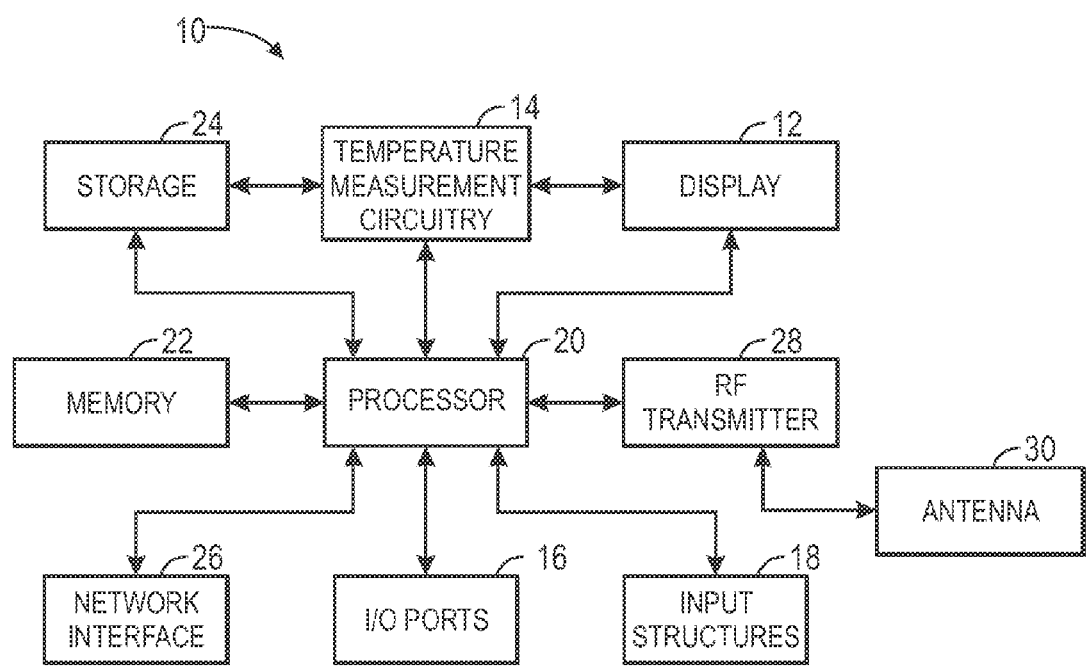
FIG. 1 is a schematic block diagram of an electronic device with display panel temperature measuring circuitry, in accordance with an embodiment.

As may be appreciated, electronic devices may include various components that contribute to the function of the device. For instance, FIG. 1 is a block diagram illustrating components that may be present in one such electronic device 10. Those of ordinary skill in the art will appreciate that the various functional blocks shown in FIG. 1 may include hardware elements (including circuitry), software elements (including computer code stored on a computer-readable medium, such as a hard drive or system memory), or a combination of both hardware and software elements. FIG. 1 is only one example of a particular implementation and is merely intended to illustrate the types of components that may be present in the electronic device 10. For example, in the presently illustrated embodiment, these components may include a display 12, temperature measurement circuitry 14, input/output (I/O) ports 16, input structures 18, one or more processors 20, one or more memory devices 22, non-volatile storage 24, a network interface 26, an RF transmitter 28, and an antenna 30 coupled to the RF transmitter 28. The network interface 26 may provide communications capabilities through a wired (e.g., Ethernet) or wireless (e.g., Wi-Fi) network. Further, the RF transmitter 28 may provide communications through radio frequency signals.

The display 12 may be used to display various images generated by the electronic device 10. For example, the processor 20 may provide image data to the display 12. Further, the non-volatile storage 24 may be configured to store image data provided by the processor 20. The display 12 may be any suitable liquid crystal display (LCD), such as a fringe-field switching (FFS) and/or an in-plane switching (IPS) LCD. Additionally, the display 12 may have touch-sensing capabilities that may be used as part of the control interface for the electronic device 10.

The display 12 may be coupled to the temperature measurement circuitry 14, which may be controlled by the processor 20 and/or other data processing circuitry of the electronic device 10 (e.g., logic circuitry of the display 12). As will be described in more detail below, the temperature measurement circuitry 14 may enable the processor 20 and/or other data processing circuitry to detect temperature values in one or more areas of the display 12. These temperature values may be stored in the non-volatile storage 24 or communicated to an external entity (e.g., through use of the I/O ports 16, the network interface 26, or the RF transmitter 28). As will be described in more detail below, the temperature values may be useful in understanding real-world statistics of the display 12 as well as useful for adjusting the display 12 to provide better color quality.

Figure 2:
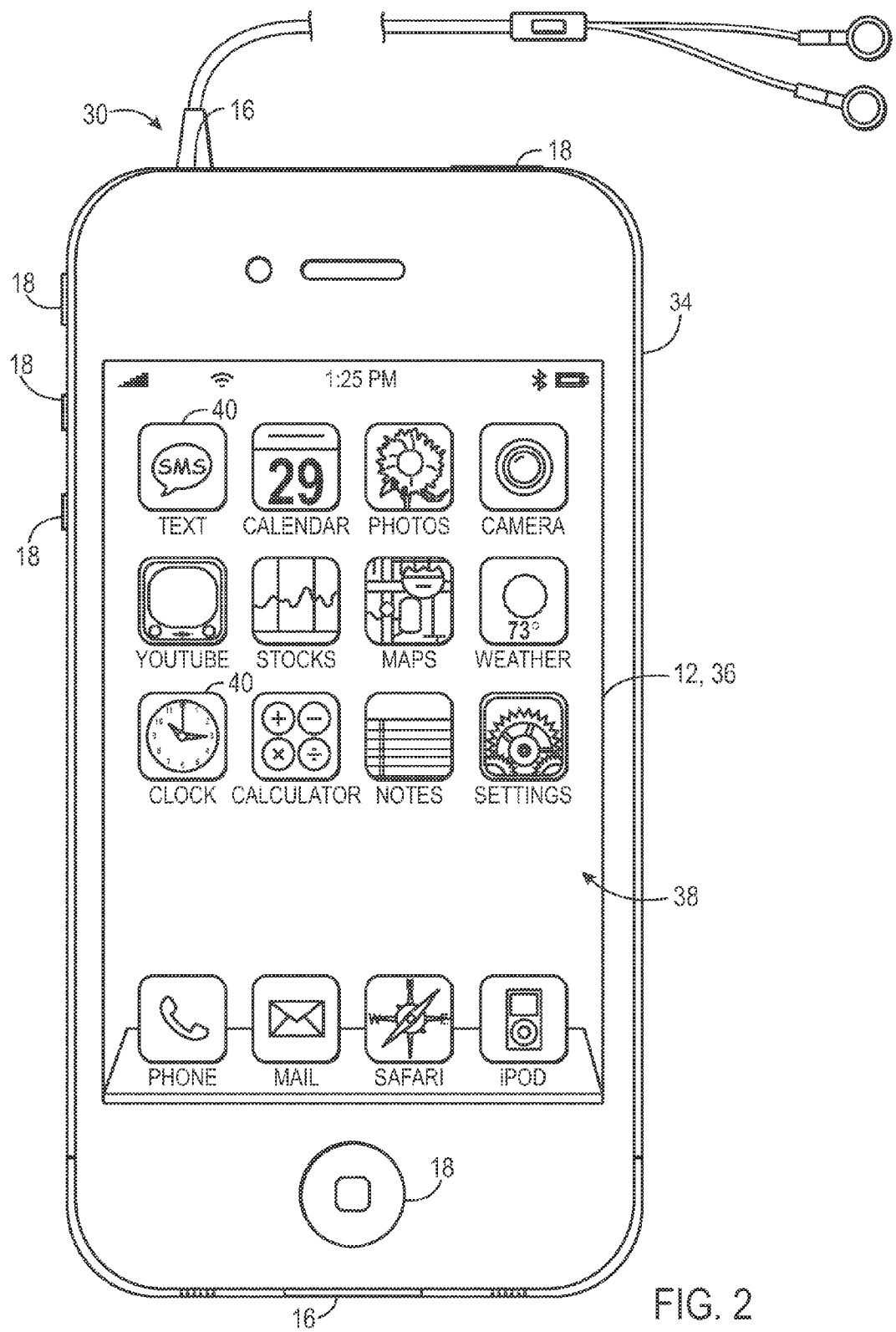
FIG. 2 is a perspective view of a handheld electronic device including the display panel temperature measuring circuitry, in accordance with an embodiment.

The electronic device 10 may take the form of a cellular telephone or some other type of electronic device. In certain embodiments, electronic device 10 in the form of a handheld electronic device may include a model of an iPod® or iPhone® available from Apple Inc. of Cupertino, Calif. By way of example, an electronic device 10 in the form of a handheld electronic device 30 (e.g., a cellular telephone) is illustrated in FIG. 2 in accordance with one embodiment. The depicted handheld electronic device 30 includes a display 12 (e.g., in the form of an LCD or some other suitable display) with the temperature measurement circuitry 14 of FIG. 1, I/O ports 16, and input structures 18.

Although the electronic device 10 is generally depicted in the context of a cellular phone in FIG. 2, an electronic device 10 may also take the form of other types of electronic devices. In some embodiments, various electronic devices 10 may include media players, personal data organizers, handheld game platforms, cameras, and combinations of such devices. For instance, the device 10 may be provided in the form of handheld electronic device 30 that includes various functionalities (such as the ability to take pictures, make telephone calls, access the Internet, communicate via email, record audio and video, listen to music, play games, and connect to wireless networks). In another example, the electronic device 10 may also be provided in the form of a portable multi-function tablet computing device. By way of example, the tablet computing device may be a model of an iPad® tablet computer, available from Apple Inc. Alternatively, the electronic device 10 may also be provided in the form of a desktop or notebook computer with the display 12. For example, such a desktop or notebook computer may be a model of an iMac®, MacBook Air®, or MacBook Pro®. Although the following disclosure uses the handheld device 30 by way of example, it should be understood that the temperature measurement circuitry 14 may be employed in like fashion in any suitable form factor, such as those mentioned above.

The display 12 may display various images generated by the handheld electronic device 30, such as a graphical user interface (GUI) 38 having icons 40. The temperature measurement circuitry 14 may be useful in providing higher quality images (e.g., GUI 38) to the handheld electronic device 30 by providing temperature readings of the display 12, such that the display 12 may be adjusted to counteract the effects of varying temperatures within the display 12. Thus, a more accurate color representation for images may be displayed on the display 12.

Figure 3:
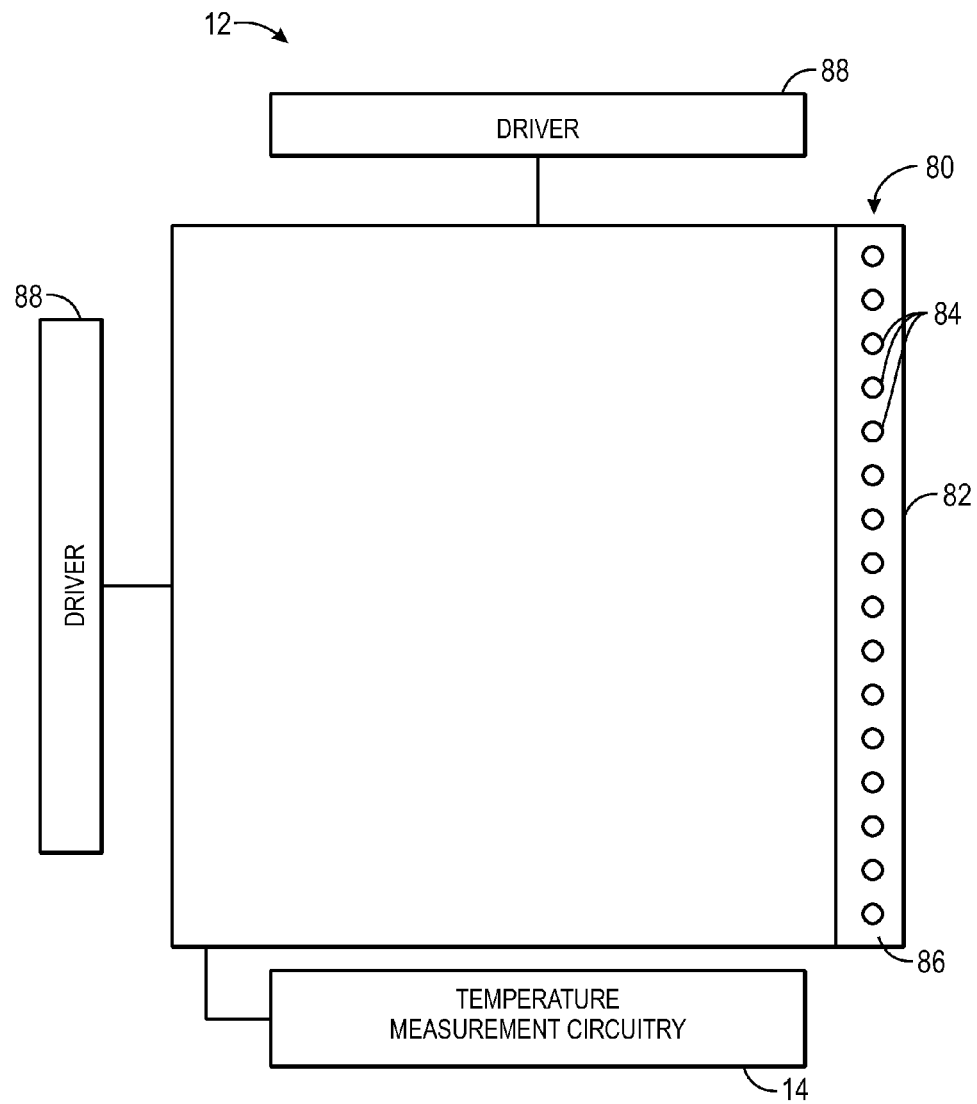
FIG. 3 is a perspective view of a display panel with integrated temperature measurement circuitry, illustrating temperature varying elements of the display panel, in accordance with an embodiment.

Effects of the temperature variations may be more clearly shown by describing elements of the display 12. FIG. 3 is an embodiment of the display 12 with the temperature measuring circuitry 14. In the illustrated embodiment, a light source 80 is disposed along an edge 82 of the display 12 and is configured to provide light to the display 12. The light source 80 may include light emitting diodes (LEDs) 84, which may include a combination of red, blue, and green LEDs and/or white LEDs. In the illustrated embodiment, the LEDs 84 may be arranged on one or more printed circuit boards (PCBs) 86 adjacent to an edge (e.g., edge 82) of the display 12 as part of an edge-lit backlight assembly. In another embodiment, a backlight unit may be configured such that the LEDs 84 are arranged on one or more PCBs 86 at the back of the display 12 in a direct-lighting backlight assembly. The LEDs 84 may include multiple groupings of LEDs, and each grouping may be referred to as an LED string. Each string may include a subset of the LEDs 84, and the LEDs within each string may be electrically connected in series with the other LEDs within the same string. The strings of LEDs 84 may be arranged end-to-end or may be interleaved.

When activated, the LEDs 84 may emit heat. Further, other heat generating components, such as display drivers 88 or other components of the handheld electronic device 30 may be positioned near the display 12 and affect temperatures of the display 12. Temperature variations in the display 12 may create undesirable effects to the color quality of the display 12. For example, in areas of the display 12 where there are increased or decreased temperatures, the white point of the display 12 may change. In areas with higher temperatures, more blue may be produced by light emitted from the LEDs 84, and in areas of decreased temperatures, more yellow may be produced by the LEDs 84. For example, in the illustrated embodiment, the LEDs 84 are mounted to the right side of the display 12. Thus, heat emitted from the LEDs 84 may cause right portions of the display 12 to have an increased temperature over right portions of the display 12. Thus, the right side of the display 12 may provide more blue when the LEDs 84 are activated and the left portions may provide more yellow when the LEDs 84 are activated. Such color variations may result in a lower quality image being provided by the display 12.

To detect and/or counteract these color variations, temperature measurement circuitry 14 may be added to the display 12 to determine desirable adjustments of the display 12 design and/or white point values. For example, the temperature measurement circuitry 14 may include a mesh layer and/or thermal diodes that enable temperature values to be determined. As will be discussed in more detail below, the processor 20 and/or other data processing circuitry of the handheld electronic device 30 may associate resistance and/or capacitance values of the mesh layer 96 with temperature values or temperature variations in the display 12.

The temperature measurements of the display 12 may be useful in helping handheld device manufacturers to understand the effects of the components of the handheld electronic device 30. For example, the temperature measurement circuitry 14 may provide indications of heat producing components of the handheld electronic device 30, and how these components affect the display 12. The temperature measurements may be provided to external entities (e.g., the handheld electronic device manufacturers) through the I/O ports 16, the network interface 26, and/or the RF transmitter 28. Further the manufacturers may observe the measured temperatures through information provided to the display 12. The temperature measurements may be used by the manufacturers to adjust their design and/or manufacturing techniques to reduce temperature changes on the display. Moreover, the temperature measurements may provide a more complete indication of actual real-world usage scenarios of the display 12. Further, the manufactures may create software models of the display 12 that attempt to determine potential temperature variations that are likely to occur. By comparing these simulated models with real-world temperature statistics of the display 12, the manufacturer may be able to determine the accuracy of the software models of the display 12.

Figure 4:
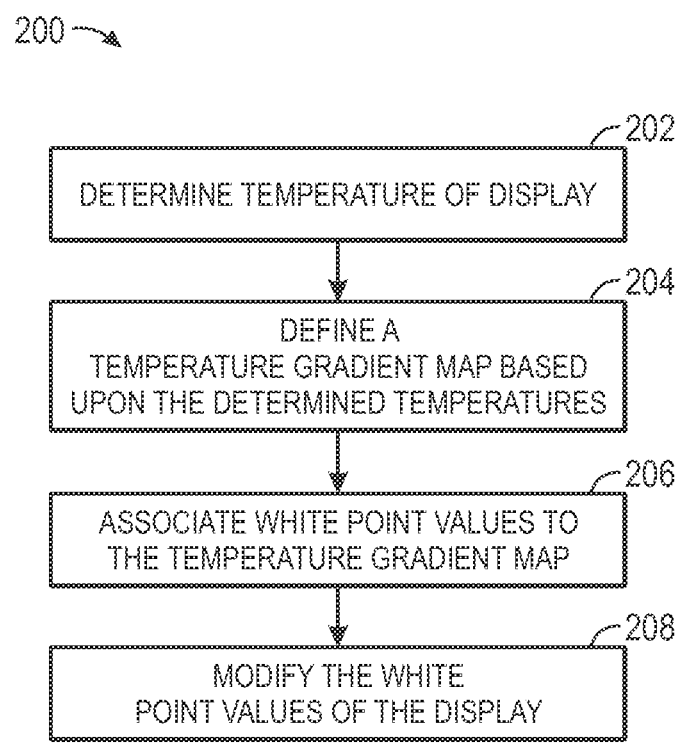
FIG. 4 is a flowchart describing a process for adjusting white point values of a display panel based upon display panel temperature values, in accordance with an embodiment.

Further, as previously discussed, the temperature measurements may be useful in altering white point values of the display 12 such that the color quality of the display 12 may be improved. FIG. 4 is a flowchart that depicts a process 200 for altering the white point values of the display 12 based upon determined temperature measurements. To alter the white point values, temperatures of the display 12 are determined (block 202). The temperature determinations may include determining a measurement of change in the temperature, or an actual temperature of certain regions of the display 12. For example, the temperature detection circuitry 14 may determine an increase of 10 degrees in a certain region or may detect that a certain region is 110 degrees.

Figure 5:
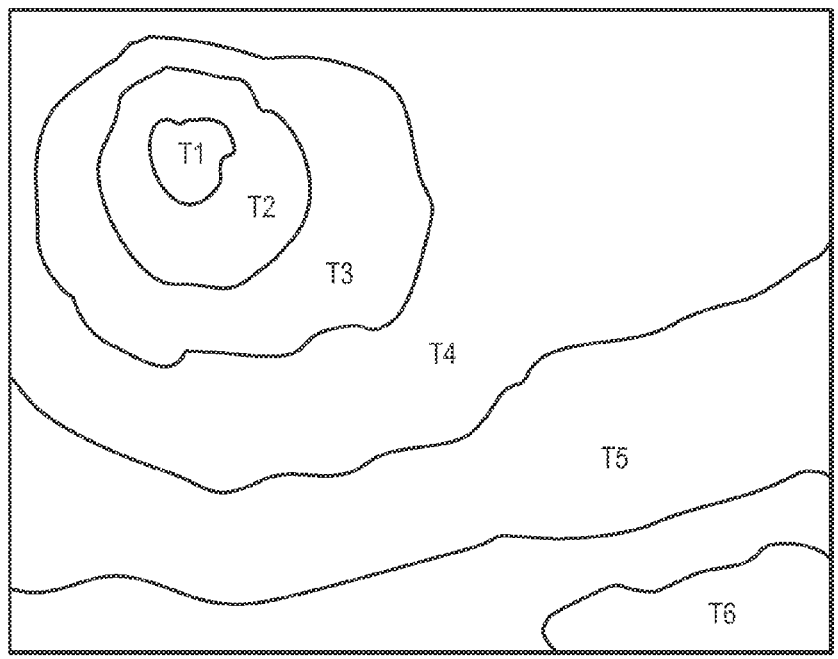
FIG. 5 is an illustration of a temperature gradient map, in accordance with an embodiment.

The temperature determinations may be used to define a temperature gradient map 220, as depicted in FIG. 5 (block 204). The temperature gradient map 220 provides regions of temperature values (e.g., T1-T6) for the display 12 based upon the temperature determinations. In some embodiments, the temperature regions (e.g., T1-T6) may be determined by threshold ranges of temperature changes or temperature values. For example, temperature region T1 may be temperature changes in the range of 25-30 degrees, temperature region T2 may be temperature changes in the range of 23-24 degrees, temperature region T3 may be temperature changes in the range of 15-22 degrees, etc. In other embodiments, the gradient map 220 may be much more granular.

Figure 6:
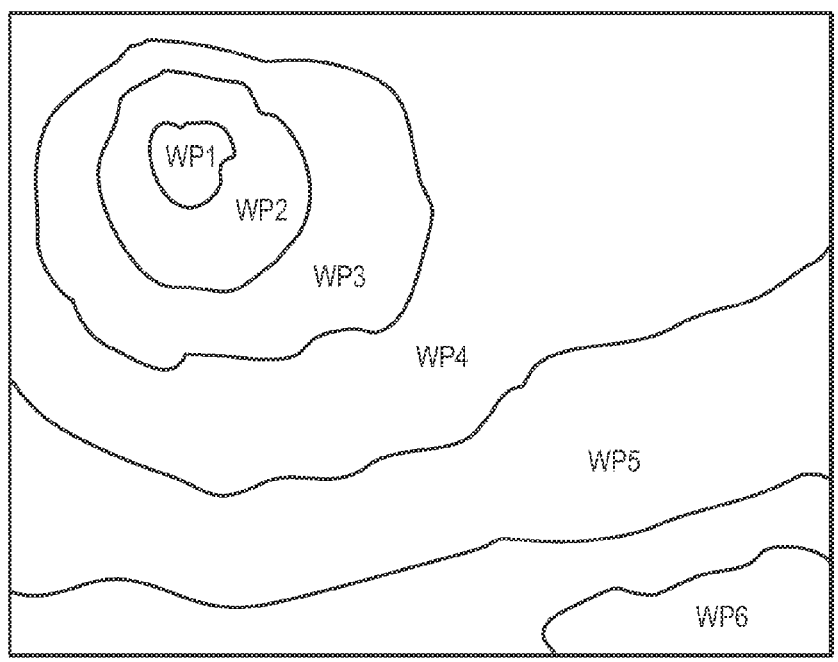
FIG. 6 is an illustration of a white point value map, in accordance with an embodiment.

As previously discussed, temperature fluctuations in the display 12 may affect the color quality of the display. For example, in areas of the display 12 where the temperature is hotter, blue hues may be present. In areas of the display 12 where the temperature is cooler, yellow hues may be present. Thus, it may be beneficial to associate white point values of the display 12 with the temperatures obtained from the temperature gradient map 220 (block 206) to counteract color quality maladies introduced by temperature variations in the display 12. For example, FIG. 6 illustrates a white point gradient map 222 that is derived by associating white point values with the temperature gradient map 220 of FIG. 5. As previously discussed, the white point values may change based upon temperature changes in the display 12. For example, as temperature increases within the display 12, more blue may be presented. Further, as temperature decreases within the display 12, more yellow may be presented. Thus, new target white point values (e.g., WP1-WP6) may be applied based upon the temperature determinations. For example, the new target white point values may be applied to the temperature gradient map. The new target white point values may represent changes that may be provided to the original white point configuration of the display 12 to account for the temperature determinations. For example, the target white point value WP1 may be associated to determined temperature T1. T1 may be a hot temperature value, causing a blue tint to be emitted. Target white point value WP1 may include white point values that increase a yellow tint to offset the emitted blue tint.

The white points of the display may be modified based upon the white point values (e.g., WP1-WP7) (block 208). Any suitable way of altering the white point of the display 12 may be employed. For example, in one embodiment, the white points of the display 12 may be modified by altering an amount of current passing through the LEDs 84, to adjust the white points. For example, if the emitted white point has a blue tint when compared to the target white point, the current through a string of yellow tinted LEDs 84 may be increased to produce an output that substantially matches the target white point. By increasing the current through strings of LEDs 84, the overall brightness of backlight 80 also may increase. In other embodiments, the ratio of the currents passing through LED strings may be adjusted to emit a white point that substantially matches the target white point while maintaining a relatively constant brightness.

In certain embodiments, the white points of the display 12 may be modified through software instructions provided to the processors 20 of the handheld electronic device 30. The processors 20 may provide modified image data to the display circuitry of the display 12 based upon temperature measurements obtained through the temperature detection circuitry 14 or the temperature gradient map 220. The modified image data may modify the color attributes of the image to reduce blue or yellow hues caused by variations in temperature.

Additionally, it may be beneficial for manufacturers to understand the display 12 temperature variations occurring in the field. In certain embodiments, temperature statistics for the handheld electronic device 30 (e.g., the temperature measurements obtained by the temperature detection circuitry 14, temperature gradient maps 220, or statistical data relating to the temperature measurements) may be provided to the manufacturer from the handheld electronic device 30. For example, the temperature statistics may be provided to the manufacturer through the I/O ports 16, the network interface 26, or the RF transmitter 28. The statistical information may be useful in providing display 12 troubleshooting when issues arise and may help the manufactures provide enhanced designs by understanding real-world temperature measurements of the display 12 in the field.

As previously discussed, embodiments of the temperature measurement circuitry 14 may include using attributes of a conductive mesh layer disposed in or on the display 12 to determine temperatures in one or more areas of the display 12. Further, in certain embodiments, thermal diodes may be used to determine temperature values of the display 12.

Figure 7:
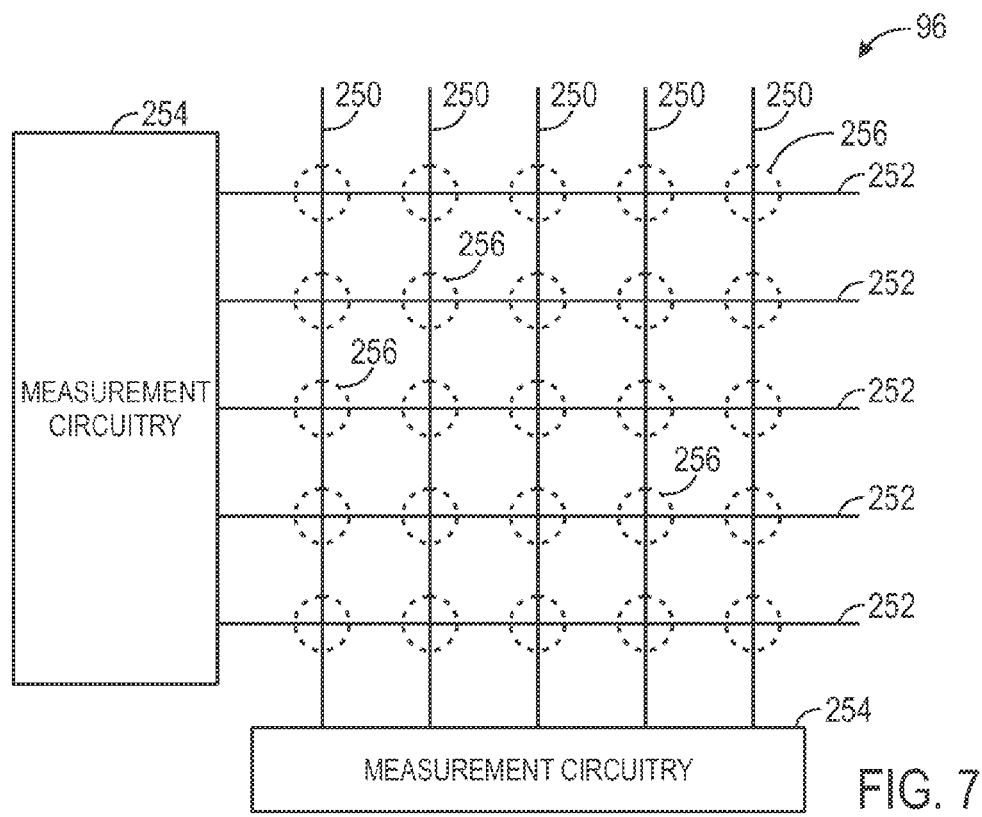
FIG. 7 is a schematic diagram of temperature measuring circuitry, in accordance with an embodiment.
Figure 8:
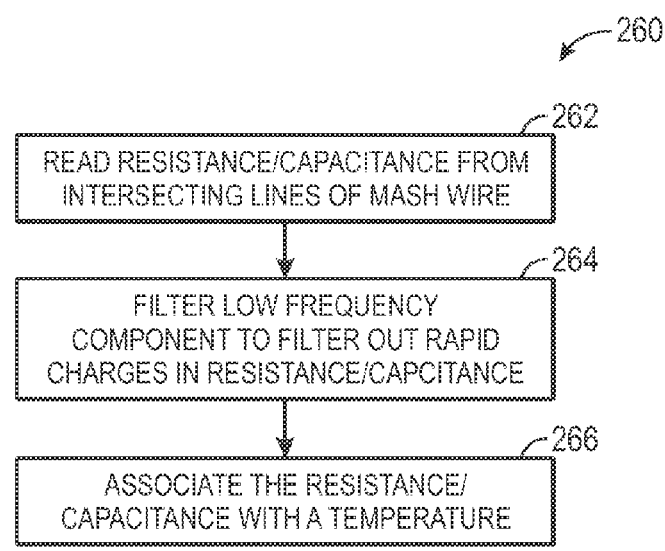
FIG. 8 is a flowchart depicting a process for determining temperature values of a mesh layer.

To illustrate the temperature measurement capabilities using the mesh layer 96, FIGS. 7 and 8 will be discussed in conjunction. FIG. 7 illustrates the mesh layer 96 with measurement circuitry 254. FIG. 8 is a flowchart depicting a process 260 for determining temperature values using the mesh layer 96. As illustrated in FIG. 8, the mesh layer 96 may include rows 250 and columns 252 of wire. In some embodiments, the wire may include indium tin oxide (ITO). The rows 250 and columns 252 may be coupled to measurement circuitry 254. In certain embodiments, the measurement circuitry 254 may measure a baseline resistance and/or capacitance at the portions of the mesh layer 96 where the rows 250 and columns 252 intersect (e.g., areas 256) (block 262). In certain embodiments, the temperature measurements may be associated with resistance and/or capacitance values that transition slowly because temperatures may not change rapidly over time. Thus, rapid variations in resistance and/or capacitance may be filtered with a high frequency filter (i.e., a low pass filter) (block 264). The measurement circuitry 254 may then provide the filtered resistance and/or capacitance measurements to the processor 20 or other data processing circuitry.

The processor 20 or other data processing circuitry may associate the filtered resistance and/or capacitance measurements with temperature values (block 266). For example, as temperature decreases, the resistance of the wires may decrease. Further, computer models or experimental data may provide a correlation between temperature values and capacitance values, such as a decrease in temperature correlating to an increase in capacitance. Thus, the resistance and/or capacitance values of the areas 256 may be associated with temperature values in the mesh layer 96, and thus, temperature values in the display 12. In certain embodiments the association between the resistance and/or capacitance values with temperature values may be provided by a lookup table stored in the memory 22 or storage 24 of FIG. 1. In other embodiments, the temperature values may be calculated through processor 20 instructions using the resistance and/or capacitance values.

In some embodiments, the measurement circuitry 254 may determine temperature changes rather than actual temperature measurements of the display 12. For example, baseline resistances and/or capacitances may be determined at various points in the mesh layer 96 (e.g., areas 256) by the measurement circuitry 254. As discussed above, a low-pass filter may filter high frequency changes in the resistance and/or capacitance. The measurement circuitry 254 may detect changes from the baseline resistance and/or capacitance and associate the changes in resistance and/or capacitance with temperature changes in the display 12. For example, if the resistance decreases from the baseline resistance at a certain point, the processor 20 may associate the decrease in resistance with a decrease in temperature because as temperature decreases resistance decreases. Further, if an increase in resistance is detected, the processor 20 may associate the change with an increase in temperature.

Figure 9:
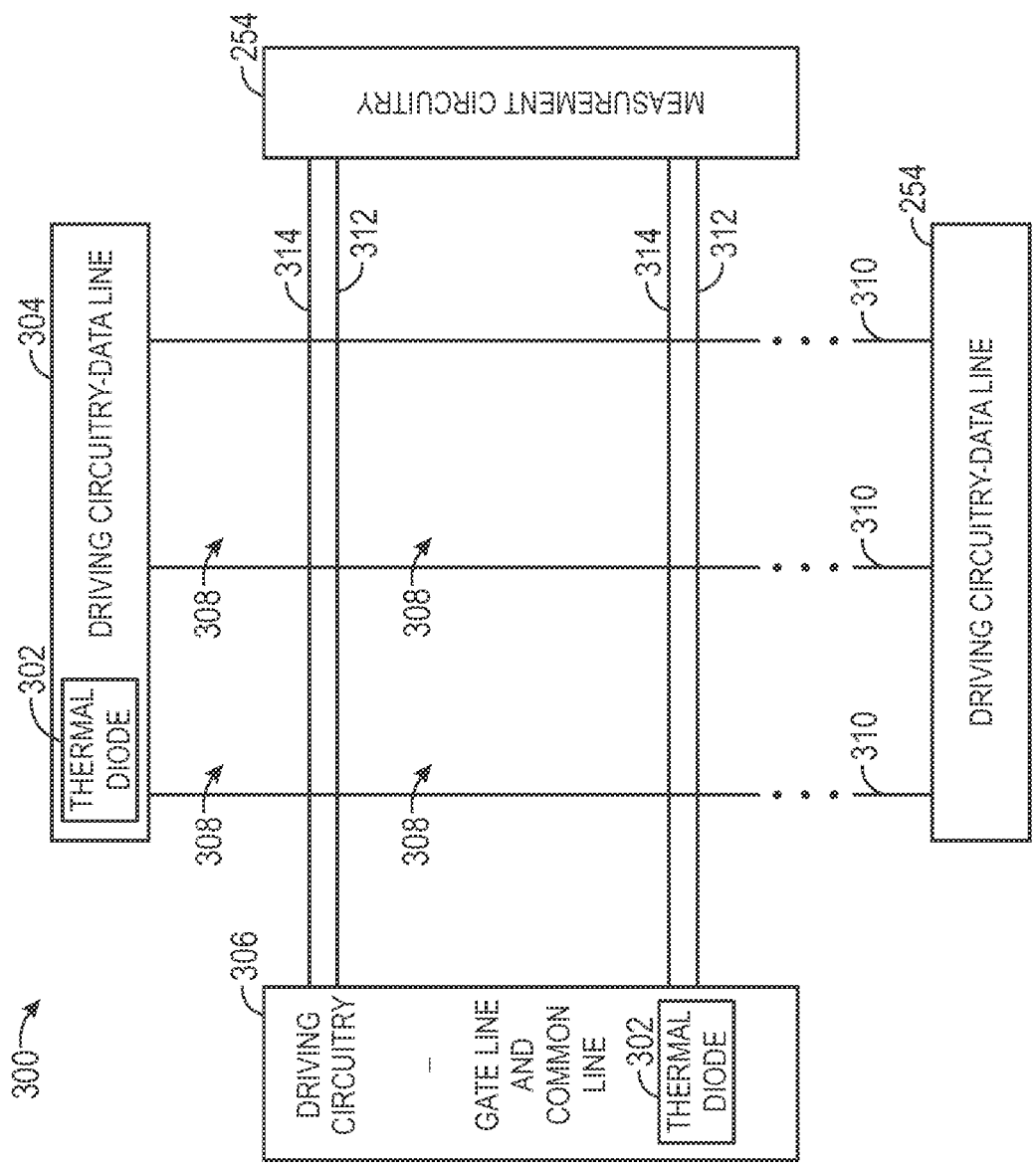
FIG. 9 is a schematic diagram of display panel circuitry having temperature measuring elements, in accordance with an embodiment.

In some embodiments, other temperature measurement circuitry may be included in the display 12. For example, thermal diodes may determine temperature values of certain areas of the display 12. FIG. 9 is a schematic view of display circuitry 300 with a mesh layer 96 and thermal diodes 302 incorporated into the data line driving circuitry 304 and driving circuitry 306. As depicted, the pixels 308 may be disposed in a matrix that forms an image display region of the display 12. In such a matrix, each pixel 308 may be generally defined by the intersection of data or source lines (or "wires") 310 and scanning or gate lines (or "wires") 312. The pixel array may also include common lines (or "wires") 314 to apply voltages to common electrodes of the pixel array.

In the depicted embodiment, the data line driving circuitry 304 sends image or data signals to the pixels via the respective data lines 310. Such image signals may be applied by line-sequence (i.e., the data lines 310 may be sequentially activated during operation). The gate lines 312 may provide scanning signals from the driving circuitry 306 such that thin film transistors (TFTs) may be activated and deactivated (i.e., turned on and off) based on the respective presence or absence of a scanning signal. When activated, the TFTs may store the image signals received via a respective data line 310. In certain embodiments, the data lines 310 and the gate lines 312 may make up the mesh layer 96. In such embodiments, measurement circuitry 254 may be coupled to the data lines 310 and the gate lines 312 such that temperature values may be determined by using the mesh layer 96 as discussed above.

It may be beneficial to determine additional temperature values near other components of the display 12. For example, the driving circuitry 304 and/or 306 may produce heat, causing locations of the display 12 to be warmer near the driving circuitry 304 and/or 306. Thermal diodes 302 incorporated into the data line driving circuitry 304 and the driving circuitry 306 may be useful in determining temperatures in the driving circuitry 304 and 306. The thermal diodes 302 may be provided with a steady current from the data line driving circuitry 304 and the driving circuitry 306. The processor 20 of FIG. 1 or other data processing circuitry may be used to measure a voltage in the thermal diodes 302 that changes as temperature changes within the display 12. For example, as the temperature of the thermal diodes 302 increases, the voltage provided by the thermal diodes 302 may decrease. The change in voltage provided by the thermal diodes 302 may be associated with specific temperature values, or may be associated with a specific temperature change in the data line driving circuitry 304 and/or the driving circuitry 306. The temperature measurements gathered from the thermal diodes 302 may be stored in the storage 24.

Determining display 12 temperatures may be very useful in manufacturing high quality displays 12. Measuring display 12 regions (e.g., areas 256) to determine temperature measurements may enable manufacturers to more clearly understand the effects of integrated circuit designs of handheld electronic devices 30 during the design process. Further, in certain embodiments, such temperature measurement may be useful in dynamically adjusting white points of the handheld electronic device 30 to obtain better image quality on the display 12. Further, temperature statistics may help manufacturers create enhanced designs based upon real-world usage.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. Temperature-measuring display system, comprising:
a display panel configured to display a graphical image;
temperature measurement circuitry, comprising:
 a mesh layer disposed in or on the display panel, wherein the mesh layer comprises rows and columns of wire;
 measurement circuitry configured to measure baseline resistance values or the baseline capacitance values or a combination thereof, at various points in a mesh layer disposed in or on the display panel and to determine temperature values in one or more areas of the display panel that correspond to various intersecting points of the rows and columns of the mesh layer based upon electrical attributes of the rows and columns in the mesh layer; and
a processor configured to control the display panel based at least in part upon the temperature values.

2. The temperature-measuring display system of claim 1, wherein the measurement circuitry is configured to determine the temperature values at each intersecting point of the rows and the columns.

3. The temperature-measuring display system of claim 1, wherein the temperature values represent a temperature measurement at the one or more areas of the display panel.

4. The temperature-measuring display system of claim 1, wherein the temperature values represent a change in temperature from baseline temperature values at the one or more areas of the display panel.

5. The temperature-measuring display system of claim 1, wherein the temperature measurement circuitry is configured to measure at least one of resistance values or capacitance values of the mesh layer in the plurality of locations that correspond to intersections of the rows and columns of wire and determine the temperature values of the intersections based at least in part upon the measured values of the mesh layer.

6. The temperature-measuring display system of claim 5, wherein the temperature measurement circuitry comprises a low-pass filter configured to filter high frequency components of the measured resistance values, the capacitance values, or a combination thereof.

7. The temperature-measuring display system of claim 1, comprising:
a driver integrated circuit configured to provide data signals for the graphical image; and
one or more thermal diodes disposed in the driver integrated circuit, wherein the temperature measurement circuitry is configured to provide a temperature measurement of the driver integrated circuit based upon measurements obtained from the one or more thermal diodes.

8. The temperature-measuring display system of claim 1, comprising display circuitry configured to generate a temperature gradient map based at least in part upon the temperature values.

9. The temperature-measuring display system of claim 8, wherein the temperature gradient map comprises regions of temperature value ranges based at least in part upon the temperature values.

10. The temperature-measuring display system of claim 1, comprising the display circuitry configured to generate a white point gradient map based at least in part upon the temperature values.

11. The temperature-measuring display system of claim 10, wherein the white point gradient map comprises regions of white point value ranges based at least in part upon the temperature values.

12. The temperature-measuring display system of claim 1, comprising display circuitry configured to adjust one or more white point values based at least in part upon the temperature values.

13. The temperature-measuring display system of claim 12, wherein the display circuitry is configured to adjust the white point value to offset an increased blue color when one or more temperature values is above a baseline value.

14. The temperature-measuring display system of claim 12, wherein the display circuitry is configured to adjust the white point value to offset an increased yellow color when one or more temperature values is below a baseline value.

15. The temperature-measuring display system of claim 1, comprising communications circuitry or an input/output port configured to provide the temperature values to an entity external to the temperature-measuring display system.

16. A method, comprising:
measuring, via measurement circuitry of a display panel, baseline resistance values or the baseline capacitance values or a combination thereof, at various points in a mesh layer disposed in or on the display panel, wherein the mesh layer comprises rows and columns of electrically conductive lines;
determining, via the measurement circuitry, a change in resistance, a change in capacitance, or combination thereof from the baseline resistance, capacitance, or combination thereof at various intersecting points of the rows and columns of electrically conductive lines in the mesh layer;
associating, via the processing circuitry, the change in resistance, the change in capacitance or combination thereof of the rows and columns of electrically conductive lines with one or more temperature values that correspond to various intersecting points of the rows and columns of electrically conductive lines; and
controlling the display panel, via the processing circuitry, based at least in part upon the temperature values.

17. The method of claim 16, wherein controlling the display panel comprises adjusting, via the circuitry, white point values of the display panel based at least in part upon the one or more temperature values.

18. The method of claim 16, wherein controlling the display panel comprises providing, via the circuitry, the one or more temperature values to an entity external to the display panel.

19. The method of claim 16, comprising comparing the one or more temperature values with a simulated temperature value to determine an accuracy of the simulated temperature value.

20. The method of claim 16, comprising determining a plurality of baseline temperature measurements by correlating the determined resistance values with the one or more temperature values.

21. The method of claim 16, comprising determining the one or more temperature values by correlating a range of resistance values with a specific temperature value.

22. The method of claim 16, comprising:
filtering high frequency components from at least one of the baseline resistance values, the baseline capacitance values, the change in resistance, or the change in capacitance, via a low-pass filter; and
determining the one or more temperature values based at least in part upon at least one of the filtered baseline resistance values, the filtered baseline capacitance values, the filtered change in resistance, or the filtered change in capacitance.

23. An electronic device, comprising:
a display panel configured to display a graphical image;
a processor configured to provide image data to the display panel; and
temperature measurement circuitry, comprising:
a mesh layer disposed in or on the display panel, wherein the mesh layer comprises rows and columns of wire, and wherein resistance values, capacitance values, or a combination thereof at various intersecting points of the rows and columns of wire change based upon temperature changes of the display panel;
measurement circuitry, configured to determine at least one of the resistance values or the capacitance values at various intersecting points of the rows and columns of wire, wherein the processor is configured to determine one or more temperature values in one or more areas of the display based at least in part upon the resistance values, capacitance values, or combination thereof; and
a processor configured to control the display panel based at least in part upon the temperature values.

24. The electronic device, of claim 23, comprising output circuitry comprising at least one of an input/output port, a network interface, or an RF transmitter; wherein the processor is configured to transmit temperature statistics of the display panel via the output circuitry.

25. The electronic device of claim 23, comprising at least one of storage or memory configured to store temperature statistics of the display panel.

26. The electronic device of claim 23, comprising at least one input structure configured to accept an input from a user of the electronic device, wherein the input represents a request to display temperature statistics and the processor is configured to selectively provide image data representative of the temperature statistics to the display panel based upon the input.

27. A method, comprising:
- measuring, via measurement circuitry of a display panel, baseline resistance values or the baseline capacitance values or a combination thereof to determine a plurality of temperature values that correspond to various points in a mesh layer disposed in or on the display panel;
- generating, via display circuitry, a temperature gradient map that corresponds to various intersecting points of rows and columns of the mesh layer disposed in or on the display panel based at least in part on the plurality of temperature values; and
- adjusting, via processing circuitry, one or more white point values of the display panel based at least in part on the plurality of temperature values.

* * * * *